UNITED STATES PATENT OFFICE 2,471,621

MERCURY COMPOUNDS AND PROCESS OF MAKING SAME

Max Hartmann and Werner Bosshard, Riehen, Switzerland, assignors to Ciba Pharmaceutical Products Inc., Summit, N. J., a firm No Drawing. Application June 30, 1945, Serial No. 602,675. In Switzerland August 4, 1944

14 Claims. (Cl. 260—431)

The present invention relates to the manufacture of new mercury compounds of the formula $$R-Hg-S-R_1-A$$

and to their use as bactericides, fungicides or insecticides. In this formula R and $R_1$ represent organic radicals and A stands for a tertiary amino group. For example, R is an alkyl, cycloalkyl, aryl or a heterocyclic radical such as methyl, ethyl, propyl, ethoxyethyl, methylcyclohexyl, phenyl or pyridyl, $R_1$ is an alkylene, aralkylene or arylene such as ethylene, propylene, phenylenemethylene or phenylene and A is a dialkylamino group, for example, a dimethylamino group, a diethylamino group or a piperidino group. There may be mentioned, for example, ethylmercurithioethyl-dimethylamine, ethylmercurithioethyl-diethylamine, propylmercurithioethyl-dimethylamine, dodecylmercurithioethyl - dimethylamine, propylmercurithioethyl-diethylamine, ethylmercurithioethyl-dimethylamine, ethylmercurithioethyl - piperidine, phenylmercurithioethyl - dimethylamine, pyridylmercurithioethyl-dimethylamine and ethylmercurithiophenyl-dimethylamine.

The new mercury compounds are obtained by causing organic mercury hydroxides or salts to react with thioamines which contain the radical of the formula $$-S-R_1-A$$

in which $R_1$ and A have the above indicated significance. As thioamines there are used especially mercaptans, if required, in the form of their salts, such as dialkylaminoalkylmercaptans or dialkylaminophenylmercaptans. However, there can also be used disulfides, such as bisdialkylaminoalkyldisulfides or bisdialkylaminophenyldisulfides. The reaction is advantageously carried out in alcohol.

The indicated tertiary mercurithioamines are sparingly soluble in water. They possess excellent bactericidal, fungicidal and insecticidal properties and therefore find application as bactericides, fungicides and insecticides, alone or in solutions, in emulsions or in strewing powders. It has further been found of advantage to admix therewith other agents which have these actions.

The following examples illustrate the invention, the parts being by weight unless otherwise stated and the relationship of parts by weight to parts by volume being the same as that of the kilogram to the liter:

Example 1

16 parts of a mixture of ethyl mercury chloride and bromide are suspended in 150 parts by volume of alcohol and boiled for 20 minutes after addition of 5 parts by volume of 10N-caustic soda solution. When cold, the solution is filtered and the filtrate is poured into a solution of dimethylaminoethylmercaptan which has been prepared by reacting 7.5 parts of dimethylaminoethylmercaptan-hydrochloride in 70 parts by volume of alcohol with addition of 5 parts by volume of 10N-caustic soda solution and filtering in the cold. This solution is boiled for 1 hour under reflux, the alcohol is distilled off and the residue taken up in ether. After distilling off the ether there are obtained 15 parts of ethylmercurithioethyl-dimethylamine as an oil which boils at 124° C. under a pressure of 0.1 mm. mercury; it can also be distilled with steam.

The same compound can also be prepared in the following manner:

31 parts of a mixture of ethyl mercury chloride and bromide are introduced into 140 parts by volume of alcohol containing 2.6 parts of dissolved sodium. Further, 15 parts of bis-dimethylaminoethyl - disulfide - hydrochloride are introduced into 140 parts by volume of alcohol containing 2.3 parts of dissolved sodium, and the whole is filtered. The filtrate is poured into the above solution of the ethyl mercury hydroxide and boiled for 1½ hours under reflux. The product is worked up as described above and 29 parts of the said mercurithioamine compound are then obtained.

An aqueous solution of 0.05 per cent strength of this compound can be used as a disinfectant preparation.

0.01 part of ethylmercurithioethyl-dimethylamine is shaken with 9 parts of a solution of 1 per cent strength of phenoxyethyl-dimethyl-dodecylammoniumbromide (prepared by causing phenoxyethyldimethylamine to react with dodecylbromide) and the solution thus obtained is neutralized with acetic acid. The solution is made up with water to 10 parts and there is thus obtained a very effective disinfectant preparation.

Example 2

3.1 parts of ethyl mercury bromide are suspended in 100 parts of alcohol, mixed with 1.7 parts of diethylaminoethylmercaptan hydrochloride and then with 3 parts by volume of 10N-caustic soda solution and boiled for 1 hour under reflux. When cold, the solution is filtered, worked up as described in Example 1 and there are thus obtained 3.1 parts of the ethylmercurithioethyl-diethylamine.

One part of the ethylmercurithioethyl-diethylamine is finely dispersed in 100 parts of water with addition of emulsifying agents. The emulsion thus obtained is used as a seed steep.

*Example 3*

A solution of n-propyl mercury hydroxide is prepared from 3.25 parts of a mixture of n-propyl mercury chloride and bromide according to Example 1 and caused to react in similar manner with 1.5 parts of dimethylaminoethylmercaptan-hydrochloride. 2.4 parts of the n-propylmercurithioethyl-dimethylamine are thus obtained.

*Example 4*

3.25 parts of a mixture of n-propyl mercury chloride and bromide are worked up according to Example 1 and caused to react with 1.7 parts of diethylaminoethylmercaptan hydrochloride as described in Example 3. 2.8 parts of n-propylmercurithioethyl-diethylamine are thus obtained.

*Example 5*

6.6 parts of phenyl mercury acetate in 250 parts by volume of alcohol are caused to react with 2 parts by volume of 10N-caustic soda solution during 30 minutes on the water-bath, and filtered when cold. The filtrate is mixed with a solution of 2.2 parts of dimethylaminoethylmercaptan in alcohol and the alcohol is distilled off on the water bath. The residue is taken up in alcohol and filtered. The phenylmercurithioethyl-dimethylamine crystallizes from the solution; it melts at 105–106° C. after recrystallizing from alcohol.

*Example 6*

6.2 parts of ethyl mercury bromide are caused to react with caustic soda solution as described in Example 1 and the filtered solution is mixed with an alcoholic solution of 2.6 parts of para-mercapto-dimethylaniline. The para-ethylmercurithio-dimethylaniline is precipitated in crystalline form after heating for a short time. The base melts at 80° C. after recrystallizing from alcohol; it is insoluble in water.

1 part of para-ethylmercurithio-dimethylaniline is mixed with 95 parts of an inert powder capable of being strewn. A very good agent for combatting pests is thus obtained.

What we claim is:

1. A mercury compound corresponding to the formula

R—Hg—S—R₁—A wherein R is a member selected from the group consisting of alkyl, cycloalkyl and aryl univalent hydrocarbon radicals, R₁ is a member selected from the group consisting of alkylene, aralkylene and arylene divalent hydrocarbon radicals, and A stands for a tertiary dialkylamino group, R₁ being directly linked to the nitrogen atom of the latter.

2. Alkylmercurithioalkyl-dialkylamines.
3. Phenylmercurithioalkyl-dialkylamines.
4. Alkylmercurithiophenyl-dialkylamines.
5. Ethylmercurithioethyl-dimethylamine.
6. Phenylmercurithioethyl-dimethylamine.
7. Ethylmercurithiophenyl-dimethylamine.
8. A process for the manufacture of a mercury compound, comprising heating an organic mercury hydroxide of the formula R—Hg—OH wherein R is a member selected from the group consisting of alkyl, cycloalkyl and aryl univalent hydrocarbon radicals, with a compound of the group represented by the formulae

H—S—R₁—A and

A—R₁—S—S—R₁—A wherein R₁ is a member selected from the group consisting of alkylene, aralkylene and arylene divalent hydrocarbon radicals, and A stands for a tertiary dialkylamino group, R₁ being directly linked to the nitrogen atom of the latter.

9. Process for the manufacture of a mercury compound, comprising heating an alkyl mercury hydroxide with a dialkylaminoalkylmercaptan.

10. Process for the manufacture of a mercury compound, comprising heating a phenyl mercury hydroxide with a dialkylaminoalkylmercaptan.

11. Process for the manufacture of a mercury compound, comprising heating an alkyl mercury hydroxide with a dialkylaminophenyl-mercaptan.

12. Process for the manufacture of a mercury compound, comprising heating ethyl mercury hydroxide with dimethylaminoethyl-mercaptan.

13. Process for the manufacture of a mercury compound, comprising heating phenyl mercury hydroxide with dimethylaminoethyl-mercaptan.

14. Process for the manufacture of a mercury compound, comprising heating ethyl mercury hydroxide with dimethylaminophenylmercaptan.

MAX HARTMANN.
WERNER BOSSHARD.

REFERENCES CITED

The following references are of record in the file of this patent:

UNITED STATES PATENTS

| Number | Name | Date |
| --- | --- | --- |
| 1,672,615 | Kharasch | June 5, 1928 |
| 1,862,896 | Kharasch | June 14, 1932 |
| 1,972,961 | Tisdale | Sept. 11, 1934 |
| 2,129,376 | Kharasch | Sept. 6, 1938 |
| 2,135,553 | Andersen | Nov. 8, 1938 |
| Re. 22,750 | Tisdale | Apr. 30, 1946 |

OTHER REFERENCES

Whitmore, "Organic Compounds of Mercury," 1921, p. 178.

Certificate of Correction

Patent No. 2,471,621.

May 31, 1949.

MAX HARTMANN ET AL.

It is hereby certified that error appears in the printed specification of the above numbered patent requiring correction as follows:

Column 2, line 8, Example 1, for "captain-hydrochloride" read *captan-hydrochloride*;

and that the said Letters Patent should be read with this correction therein that the same may conform to the record of the case in the Patent Office.

Signed and sealed this 1st day of November, A. D. 1949.

[SEAL]

THOMAS F. MURPHY,
*Assistant Commissioner of Patents.*